United States Patent [19]

McDonald

[11] Patent Number: 5,212,471
[45] Date of Patent: * May 18, 1993

[54] POLARIZED HEADS UP DISPLAY

[75] Inventor: Mark E. McDonald, Playa del Rey, Calif.

[73] Assignee: Hughes Aircraft Company, Los Angeles, Calif.

[*] Notice: The portion of the term of this patent subsequent to Nov. 27, 2007 has been disclaimed.

[21] Appl. No.: 674,809

[22] Filed: Mar. 25, 1991

Related U.S. Application Data

[63] Continuation of Ser. No. 428,143, Oct. 27, 1989, abandoned.

[51] Int. Cl.$^5$ .............................................. G09G 3/02
[52] U.S. Cl. ...................................... 340/705; 359/13
[58] Field of Search ............... 350/174, 403, 3.7, 396; 340/705, 980; 356/350; 358/88, 92; 455/619; 359/70, 71, 63, 48, 13, 14, 630, 613

[56] References Cited

U.S. PATENT DOCUMENTS

| | | | |
|---|---|---|---|
| 2,750,833 | 5/1952 | Gross | 350/174 |
| 4,688,879 | 8/1987 | Fairchild | 350/174 |
| 4,787,711 | 11/1988 | Suzuki | 350/174 |
| 4,913,529 | 4/1990 | Goldenberg | 350/401 |
| 4,932,731 | 6/1990 | Suzuki | 350/3.7 |
| 4,973,132 | 11/1990 | McDonald et al. | 359/13 |

FOREIGN PATENT DOCUMENTS

| | | | |
|---|---|---|---|
| 0420196 | 4/1991 | European Pat. Off. | 359/13 |
| 0286962 | 4/1988 | Fed. Rep. of Germany | 359/13 |

Primary Examiner—Ulysses Weldon
Assistant Examiner—Matthew Luu
Attorney, Agent, or Firm—L. A. Alkov; W. K. Denson-Low

[57] ABSTRACT

A head-up display for vehicle including a windshield having first and second opposing air interfaces for partially reflecting imaging illumination at a predetermined air interface to produce a primary virtual image viewable by the operator of the vehicle, and a half-wave retarder interposed between the first and second air interfaces of the windshield for rotating the linear polarization of illumination transmitted therethrough. An imaging illumination source provides linearly polarized imaging illumination to the first air interface of the windshield at an angle which is selected to enhance the reflection of S-polarized light and the transmission of P-polarized light, with the polarization being selected so as to provide S-polarized imaging illumination at the predetermined beam splitting air interface.

9 Claims, 2 Drawing Sheets

POLARIZED HEADS UP DISPLAY

This is a continuation of application Ser. No. 07/428,143 filed Oct. 27, 1989 now abandoned.

BACKGROUND OF THE INVENTION

The disclosed invention is directed generally to head-up displays for vehicles, and more particularly is directed to a head-up display which provides for reduced ghost image intensity.

Head-up displays are utilized in vehicles such as automobiles to produce virtual images of vehicle operating parameter indicators that appear to be ahead of the vehicle windshield and are therefore viewable by the vehicle operator without diversion of his or her eyes to an instrument panel inside the vehicle and without refocusing.

A known head-up display technique involves utilizing a vehicle windshield surface as a beam-splitter for partially reflecting imaging illumination incident thereon. However, as a result of the thickness of the vehicle windshield and reflections at a windshield surface that is not the primary or main reflecting surface, secondary or ghost images are produced. Depending on ambient lighting conditions, ghost image intensity can be sufficiently bright relative to the primary or main image intensity so as to be objectionable.

SUMMARY OF THE INVENTION

It would therefore be an advantage to provide a head-up display for vehicles which has reduced ghost image intensities for different ambient lighting conditions.

Another advantage would be to provide a head-up display for vehicles provides for high contrast of primary image to ghost image.

The foregoing and other advantages are provided by the invention in a head-up display which includes a vehicle windshield having first and second opposing air interfaces for partially reflecting imaging illumination at a predetermined air interface to produce a primary virtual image viewable by the operator of the vehicle, and further includes a polarization rotating element interposed between the first and second air interfaces of the windshield for rotating the linear polarization of illumination transmitted therethrough. An imaging illumination source provides linearly polarized imaging illumination to the first air interface of the windshield at an angle which is selected to enhance the reflection of S-polarized light and the transmission of P-polarized light, with the polarization being selected so as to provide S-polarized imaging illumination at the predetermined beam splitting air interface.

BRIEF DESCRIPTION OF THE DRAWING

The advantages and features of the disclosed invention will readily be appreciated by persons skilled in the art from the following detailed description when read in conjunction with the drawing wherein.

DETAILED DESCRIPTION

Figure 1:
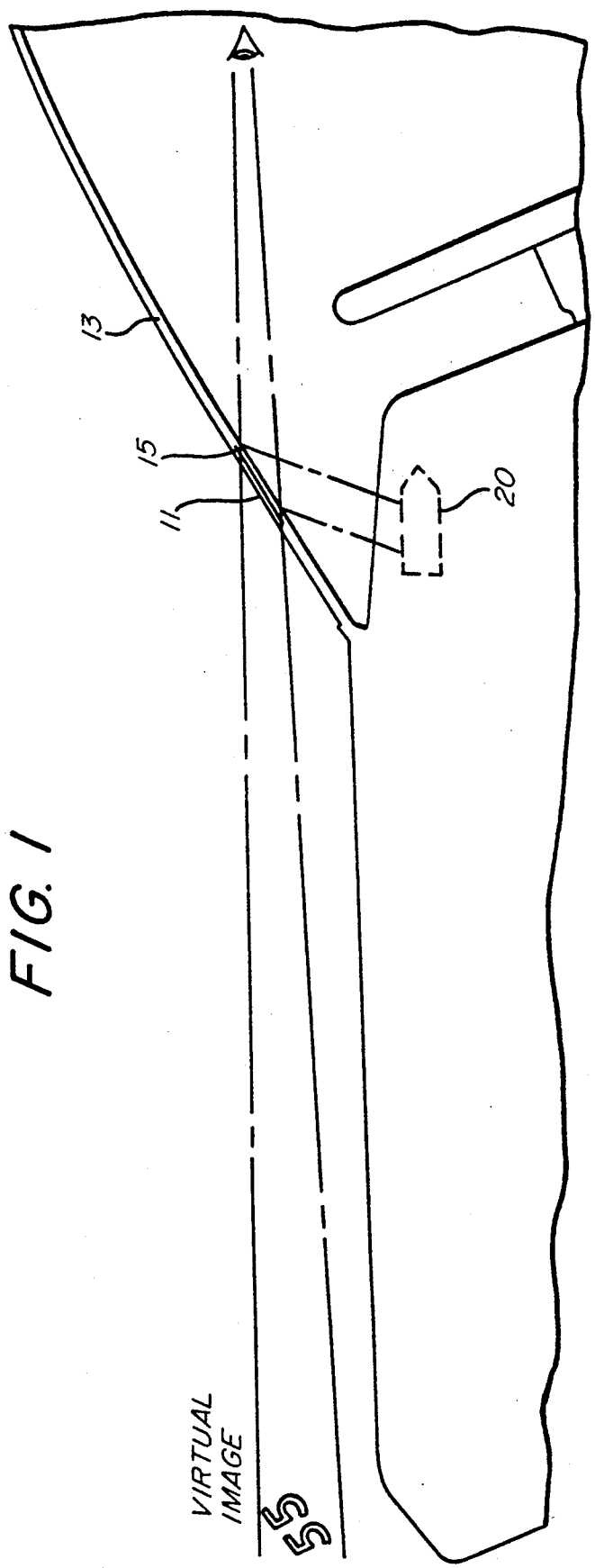
FIG. 1 is a schematic illustration of the major components of the disclosed vehicle head-up display system.

In the following detailed description and in the several figures of the drawing, like elements are identified with like reference numerals.

Referring now to FIG. 1, shown therein is a head-up vehicle instrument display system that includes an imaging illumination source 20 located in a recess in the vehicle dashboard or on the dashboard, a beam-splitter combiner element 11 that comprises a combiner region of either the inside or outside surface of a vehicle windshield 13, and a half-wave retarder 15 which is interposed between the inside and outside air interfaces of the windshield in the region of the combiner element 11. By way of example, the half-wave retarder 15 is embedded between the layers or singlets of a standard safety windshield.

The combiner element 11 partially reflects the imaging illumination toward the driver so as to produce a virtual image of an image source within the imaging illumination source 20 at a location ahead of the vehicle windshield, for example.

If the combiner element 11 comprises the outside air interface of the windshield, the half-wave plate 15 transmits imaging illumination thereto; and if the combiner element 11 comprises the inside air interface of the windshield, the half-wave plate 15 transmits the imaging illumination transmitted by the inside surface of the windshield (i.e., illumination not reflected by the combiner). By way of illustrative example, the half-wave retarder 15 should be zero-order for broad band imaging illumination, and can be multi-order for narrow band imaging illumination. The peak of the half-wave retardance at the particular incidence angle should be centered at about the peak wavelength of the imaging illumination.

One of the properties of a half-wave retarder, a known optical element, is that the linear polarization of the illumination that passes therethrough is rotated, and the subject invention advantageously utilizes that property. In particular, the imaging illumination directed to the windshield is linearly polarized, with the specific polarization depending on whether the inside or outside windshield air interface is utilized as the beamsplitter for producing the main or primary image. If the combiner element is the inside windshield air interface, the imaging illumination directed to the windshield is controlled to be S-polarized. If the combiner element is the outside windshield air interface, the imaging illumination source is configured to provide P-polarized light. In the latter case, the imaging illumination incident on the outside windshield air interface is S-polarized by virtue of passing through the half-wave plate 15.

The incidence angle of the imaging illumination directed to the windshield is preferably sufficiently close to the Brewster's angle for the material comprising the windshield to provide appropriate reflection or transmission of the imaging illumination at the inside windshield air interface. For the specific example of a glass windshield, the Brewster's angle is 56.5 degrees relative to normal. At the glass/air Brewster's angle, 100% of the P-polarized component of incident light passes therethrough without reflection, while the S-polarized component is partially reflected.

In accordance with the invention, the incidence angle of imaging illumination can be within a relatively large range while providing adequate primary-to-ghost image contrast, for example, about 47 to 72 degrees relative to normal for glass windshields, depending on the required primary-to-ghost image contrast. Thus, the invention does not impose significant limitations on the design of the windshield and dashboard.

In the specific instance where the inside windshield air interface is utilized as the combiner element 11 and the imaging illumination source is configured to provide S-polarized light, a large amount of the S-polarized imaging illumination will be reflected at the inside air interface windshield to produce the primary virtual image. As to the S-polarized illumination transmitted by the inside windshield surface combiner, the polarization thereof is rotated by the half-wave plate so that the imaging illumination incident on the outside air interface of the windshield is P-polarized, which is generally transmitted. Further, any S-polarized imaging illumination that is reflected back from the outside windshield air interface will have its polarization rotated, whereby it will be P-polarized when it reaches the inside windshield air interface, and a significant amount of such reflected beam illumination will be reflected at the inside windshield air interface. Thus, reflection of imaging illumination from the outside air interface of the windshield is significantly reduced, which significantly reduces ghost images.

By similar analysis, the use of P-polarized imaging source illumination with a combiner comprising the outside windshield air interface significantly reduces reflection at the inside windshield air interface and thereby prevents ghost images. Specifically, a large amount of the P-polarized imaging illumination will be transmitted by the inside windshield air interface. The half-wave retarder will rotate the polarization of the transmitted imaging illumination so that S-polarized illumination reaches the outside windshield air interface, which reflects a large amount of that imaging illumination. The polarization of the reflected back imaging illumination is rotated by the half-wave retarder 15 so that P-polarized illumination reaches the inside windshield air interface which transmits a large amount of such illumination to produce the virtual image of the display. Thus, reflection of imaging illumination at the inside windshield air interface is significantly reduced, which significantly reduces ghost images.

It should be appreciated that while the disclosed embodiments are described in the context of a vehicle such as an automobile, the term vehicle encompasses vehicles that include a windshield or similar transparent protective device, as well as vehicles that do not have windshields, in which case the combiner would be either the front or rear surface of a transparent panel located within the vehicle operator's forward field of view.

It is pointed out that as a result of the polarization exchange caused by the half-wave retarder, polarized sunglasses will cause a scene to have different appearance when viewed through the half-wave retarder than when viewed through the remainder of the windshield. Polarized sunglasses are typically configured to absorb polarized off-axis specular reflections, commonly perceived as glare, from sources that tilt vertically (i.e., horizontally oriented sources such as a road surface). The result is a reduction in the perceived glare from sources that tilt vertically. However, the half-wave retarder exchanges polarizations, and a scene viewed through the half-wave retarder with polarized sunglasses results in the reduction of perceived glare from horizontally tilted sources (e.g., vertically oriented glass surfaces on an office building), which is essentially a rotation of the reduction of perceived glare of a scene viewed through the windshield portion without the half-wave retarder.

Figure 2:
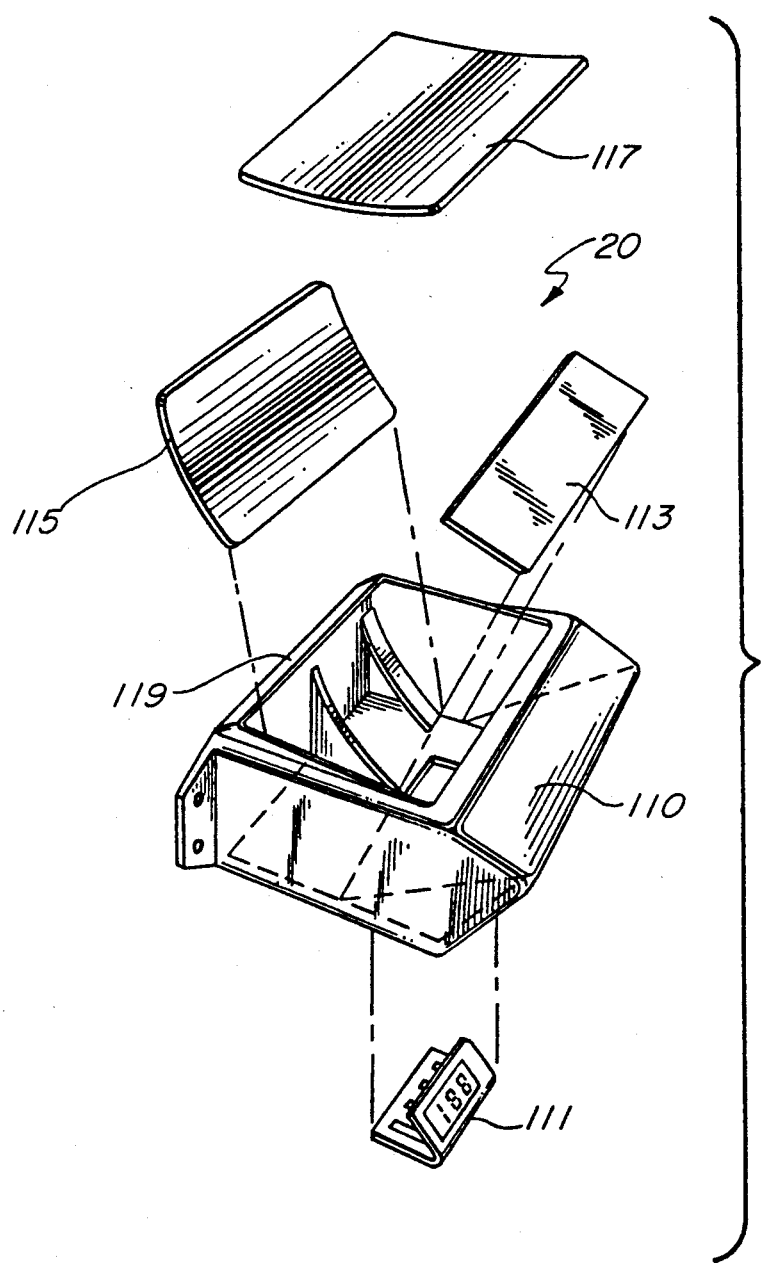
FIG. 2 is a schematic exploded view of the imaging illumination source of the head-up display system of FIG. 1.

Referring now to FIG. 2, shown therein is a detail view of the imaging illumination source 20 which includes an image source 111 comprising, for example, a segmented or matrix addressable liquid crystal display (LCD) which is configured to provide the appropriate polarization. LCD's are readily available devices and can be obtained from Seiko of Japan, for example. Also, a spectrally narrow source such as light emitting diodes available from Stanley could be utilized with an appropriate polarizer for the LED outputs. As still another alternative, the image source can comprise a high intensity vacuum fluorescent display (VFD) with an appropriate polarizer. VFD's are known display devices which are commercially available, for example, from Futaba Corporation of America, Plymouth, Mich., and commonly include segmented elements that are selectively energizable to form light emitting numerical and/or alphabetical symbols, as well as other indicia.

Inputs to the image source 111 are provided by appropriate transducing circuitry to display selected vehicle and/or engine operating parameters and conditions.

A planar fold mirror 113 secured in the housing 110 relays the imaging illumination from the image source 111 to an off-axis, aspheric mirror 115, also secured in the housing 110, which in turn relays the imaging illumination through a transparent cover 117 to the combiner element 11. While a relay mirror is included, it should be appreciated that depending on the location of the image source 111 in the imaging illumination source 20 and the location of the imaging illumination source 20 relative to the windshield, the relay mirror might not be necessary. It should also be appreciated that with an odd number of reflecting elements (e.g., three), the image source 111 must adapted to be a mirror image of the intended virtual image. With an even number of reflecting elements (e.g., two), the image source 111 would be adapted to be oriented the same as the intended virtual image.

The aspheric mirror 115 is generally concave and magnifies the image relayed to the combiner element 11, and further functions to locate the virtual image relatively far ahead of the observer. The particular curvatures of the aspheric mirror can be defined so as to compensate for the distortion introduced by the off-axis configuration of the aspheric mirror and the distortion introduced by the curvatures of the windshield.

While an aspheric mirror 115 is included in the foregoing illustrative example, a flat mirror could be utilized if it is not necessary to locate the virtual image relatively far ahead of the observer. It should also be realized that the mirrors 113 and 115 could be eliminated by directing the image source directly at the combiner 11.

The foregoing has been a disclosure of a vehicle instrument head-up display that advantageously provides for reduced ghost image intensities and high primary image to ghost image contrast, is readily implemented in vehicles such as automobiles without extensive modification of present windshield structures, and moreover does not impose significant limits on windshield and dashboard design.

Although the foregoing has been a description and illustration of specific embodiments of the invention, various modifications and changes thereto can be made by persons skilled in the art without departing from the scope and spirit of the invention as defined by the following claims.

What is claimed is:

1. A head-up display for a vehicle, comprising:
   a substantially transparent substrate having first and second opposing air interfaces for partially reflecting imaging illumination at a beamsplitter region on a selected one of said air interfaces to produce a primary virtual image viewable by the operator of the vehicle;
   image source means for directing linearly polarized imaging illumination to said beam-splitter region at an angle which enhances reflection of a first predetermined linear polarization and transmission of a second linear polarization, the polarization state of said imaging illumination depending on the air interface selected to produce the primary image occurs; and
   means interposed between said first and second opposing air interfaces and adjacent said beamsplitter region for rotating the linear polarization of imaging illumination transmitted therethrough.

2. The head-up display of claim 1 wherein said substantially transparent substrate comprises a laminar vehicle windshield and wherein said polarization rotating means comprises a half-wave retarder embedded between the layers of said windshield.

3. The head-up display of claim 2 wherein said beamsplitter region is on said first air interface, and wherein said image source means provides S-polarized imaging illumination.

4. The head-up display of claim 2 wherein said beamsplitter region is on said second air interface, and wherein said image source provides P-polarized imaging illumination.

5. The head-up display of claim 2 wherein said windshield comprises glass and wherein said imaging illumination is incident on said glass windshield at an angle within the range of about 47 to 72 degrees relative to normal.

6. A head-up display for a vehicle comprising:
   a vehicle windshield having inside and outside air interfaces for partially reflection imaging illumination at a beamsplitter region on a selected one of said air interfaces to produce a primary virtual image viewable by the operator of said vehicle;
   image source means for directing linearly polarized imaging illumination to said beam-splitter region at an angle which enhances reflection of a first predetermined linear polarization and transmission of a second linear polarization, the polarization state of said polarized imaging illumination depending on the air interface selected to produce said primary virtual image; and
   a half-wave retarder embedded in said windshield adjacent said beamsplitter region for rotating the linear polarization of imaging illumination transmitted therethrough.

7. The head-up display of claim 6 wherein said beamsplitter region is on the inside windshield air interface, and wherein said image source means provides S-polarized imaging illumination.

8. The head-up display of claim 6 wherein said predetermined air interface is on the outside windshield air interface, and wherein said image source provides P-polarized imaging illumination.

9. The head-up display of claim 6 wherein said imaging illumination is incident on said glass windshield at an angle within the range of about 47 to 72 degrees relative to normal.

* * * * *